(12) United States Patent
Joo et al.

(10) Patent No.: US 10,562,818 B2
(45) Date of Patent: Feb. 18, 2020

(54) INSULATOR COMPOSITION AND MANUFACTURING METHOD USING THE SAME

(71) Applicant: SAMSUNG ELECTRO-MECHANICS CO., LTD., Suwon-si, Gyeonggi-do (KR)

(72) Inventors: Jin Kyung Joo, Suwon-si (KR); Yong Suk Kim, Suwon-si (KR); Taek Jung Lee, Suwon-si (KR); Doo Young Kim, Suwon-si (KR); Ik Hwan Chang, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 516 days.

(21) Appl. No.: 15/355,205

(22) Filed: Nov. 18, 2016

(65) Prior Publication Data

US 2017/0349493 A1  Dec. 7, 2017

(30) Foreign Application Priority Data

Jun. 7, 2016  (KR) .................. 10-2016-0070348

(51) Int. Cl.
| | | |
|---|---|---|
| C04B 35/111 | (2006.01) | |
| C04B 35/64 | (2006.01) | |
| C04B 35/117 | (2006.01) | |
| H01B 3/12 | (2006.01) | |
| H01B 19/00 | (2006.01) | |

(52) U.S. Cl.
CPC ............ *C04B 35/117* (2013.01); *C04B 35/64* (2013.01); *H01B 3/12* (2013.01); *H01B 19/00* (2013.01); *C04B 2235/3217* (2013.01); *C04B 2235/3232* (2013.01); *C04B 2235/3418* (2013.01); *C04B 2235/442* (2013.01); *C04B 2235/656* (2013.01); *C04B 2235/6582* (2013.01); *C04B 2235/785* (2013.01)

(58) Field of Classification Search
CPC ..... C04B 35/111; C04B 35/115; C04B 35/117
See application file for complete search history.

(56) References Cited

U.S. PATENT DOCUMENTS

| | | | |
|---|---|---|---|
| 2011/0251042 A1* | 10/2011 | Araki ................... | C04B 35/111 501/32 |
| 2014/0243184 A1 | 8/2014 | Fujimura et al. | |
| 2014/0268484 A1 | 9/2014 | Kang et al. | |

FOREIGN PATENT DOCUMENTS

| | | | |
|---|---|---|---|
| JP | 2857639 B2 | | 2/1999 |
| JP | 2000344569 A | * | 12/2000 |
| JP | 2001322866 A | * | 11/2001 |
| JP | 2003-112963 A | | 4/2003 |

(Continued)

OTHER PUBLICATIONS

Machine translation 2013199414 (Year: 2013).*

(Continued)

*Primary Examiner* — Karl E Group
(74) *Attorney, Agent, or Firm* — Morgan, Lewis & Bockius LLP

(57) ABSTRACT

An insulator composition includes $Al_2O_3$ having a particle size of 120 to 500 nm. The insulator composition has a strength of 400 to 740 MPa and a particle size of 1 μm or less.

21 Claims, 6 Drawing Sheets

(56) References Cited

FOREIGN PATENT DOCUMENTS

| JP | 2013-199414 A | 10/2013 |
| JP | 2014-187004 A | 10/2014 |
| KR | 10-2014-0138568 A | 12/2014 |

OTHER PUBLICATIONS

Korean Office Action issued in corresponding Korean Patent Application No. 10-2016-0070348, dated Dec. 6, 2017, with English Translation.

* cited by examiner

INSULATOR COMPOSITION AND MANUFACTURING METHOD USING THE SAME

CROSS-REFERENCE TO RELATED APPLICATION

This application claims the benefit of priority to Korean Patent Application No. 10-2016-0070348, filed on Jun. 7, 2016 with the Korean Intellectual Property Office, the entirety of which is incorporated herein by reference.

TECHNICAL FIELD

The present disclosure relates to an insulator composition and a method of manufacturing an electronic component using the same.

BACKGROUND

Conventionally, ceramic packages may be manufactured according to a low temperature co-fired ceramic (LTCC) method or a high temperature co-fired ceramic (HTCC) method.

In the LTCC method, the sintering temperature is low, on the level of 950° C. or less. Hence, it may be difficult to manufacture ceramic packages having high strength.

The HTCC method allows for the implementation of higher strength, relative to the LTCC method, and therefore is widely used in the field of packaging, in which materials having high strength are required. The HTCC method may be used to manufacture ceramic packages having three-point bending strength of about 740 MPa.

Because the HTCC method requires a sintering temperature of 1600° C. or higher, however, a tungsten (W) or molybdenum (Mo) electrode is used on a surface or in the interior of the ceramic package, and both tungsten (W) and molybdenum (Mo) have very strong oxidizing properties. This is problematic because, in the HTCC method, the sintering process is executed in a very strong reducing atmosphere. Hence, it may be difficult to control the atmosphere.

SUMMARY

An aspect of the present disclosure provides an insulator composition having the same strength as a high temperature co-fired ceramic (HTCC) composition, even when sintered at a temperature lower than that used in the HTCC method, and sintered in an easily controlled atmosphere, and may also provide a method of manufacturing an electronic component using the insulator composition.

According to an aspect of the present disclosure, an insulator composition includes $Al_2O_3$ having a particle size of 120 to 500 nm. The insulator composition may be sintered at a temperature of 1250° C. to 1400° C., has a strength of 400 to 740 MPa and a particle size of 1 µm or less.

According to another aspect of the present disclosure, a method of manufacturing an electronic component includes simultaneously sintering an insulator composition, having a particle size of 1 µm or less and including $Al_2O_3$ having a particle size of 120 to 500 nm, and an electrode including nickel (Ni) as a main component, at a temperature of 1250° C. to 1400° C., and adjusting a reducing atmosphere (in which an $H_2$ concentration is maintained to be less than 3%) to suppress oxidation of the Ni.

According to another aspect of the present disclosure, an insulator composition includes $Al_2O_3$, $CaCO_3$, $MgCO_3$ and $SiO_2$. A grain size of the insulator composition is less than 1 µm and the insulator composition has a strength of 400 to 740 MPa.

According to another aspect of the present disclosure, a method of manufacturing an insulator composition includes a step of forming the insulator composition by sintering a base material at a temperature of 1250° C. to 1400° C. The base material includes $Al_2O_3$ having a particle size within a range of 120 to 500 nm, and the insulator composition has a strength of 400 to 740 MPa and a grain size of 1 µm or less.

BRIEF DESCRIPTION OF THE DRAWINGS

The above and other aspects, features, and advantages will be more clearly understood from the following detailed description, taken in conjunction with the accompanying drawings, in which.

DETAILED DESCRIPTION

Figure 1:
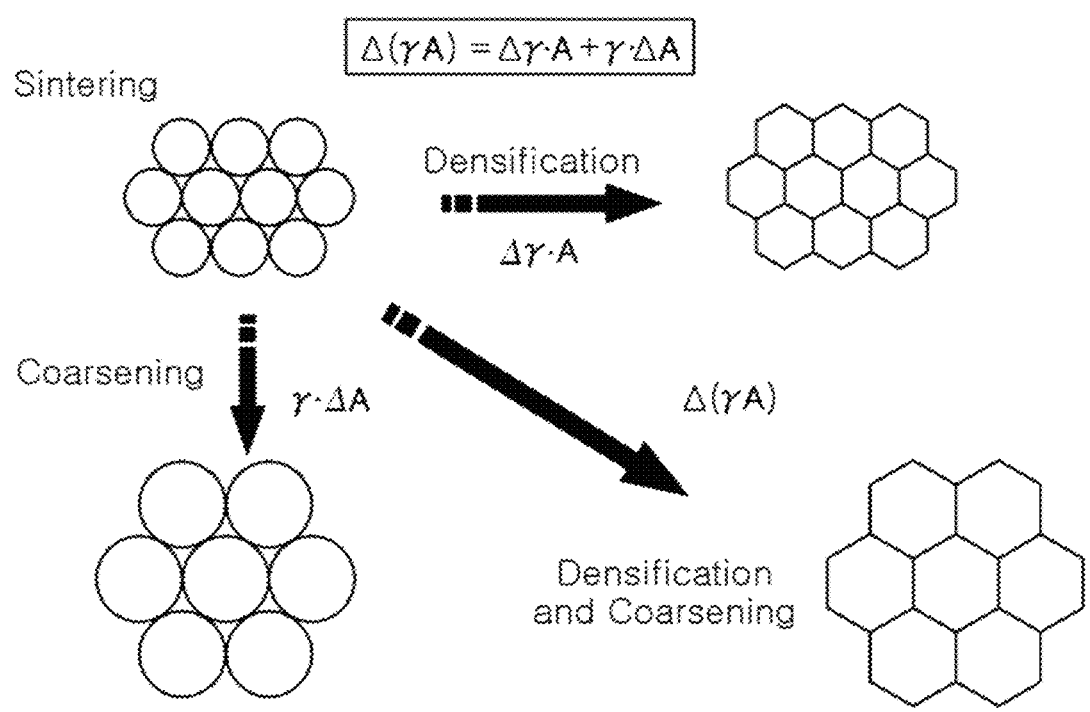
FIG. 1 schematically illustrates certain phenomena which may occur during sintering under the action of sintering force.

Hereinafter, embodiments of the present disclosure will be described with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" relative to other elements would then be oriented "below," or "lower" relative to the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

According to an exemplary embodiment in the present disclosure, an insulator composition includes aluminum oxide ($Al_2O_3$) having a particle size in the range of 120 to 500 nm as a main component of a base material thereof.

When the particle size of $Al_2O_3$ exceeds 500 nm, a sintering temperature may be significantly increased, and when the particle size of $Al_2O_3$ is less than 120 nm, the effect of lowering the sintering temperature may be insufficient. Because the effect of lowering the sintering temperature is abruptly reduced when the particle size of $Al_2O_3$ is less than 250 nm, the particle size of $Al_2O_3$ may be set within the range of 250 to 500 nm.

When the insulator composition is manufactured by adjusting the particle size of $Al_2O_3$, the base material, the sintering temperature of the insulator composition may be lowered from 1600° C. or more for a high temperature co-fired ceramic (HTCC) composition to 1250° C. to 1400° C., while the strength of the insulator composition may be the same as that of the HTCC composition. Here, the strength of the insulator composition may be in the range of 400 to 740 MPa, and the particle size of the insulator composition may be about 1 µm.

When the insulator composition is formed by the above-described method, the sintering atmosphere may be easily controlled in a process of manufacturing an electronic component such as a ceramic package, and a Ni electrode may be used as an internal electrode, instead of a tungsten (W) electrode or a molybdenum (Mo) electrode.

For example, when the insulator composition and a Ni electrode containing 0.001 to 10 wt % of a ceramic inhibitor are sintered at a temperature in the range of 1250° C. to 1400° C. by adjusting a reducing atmosphere (in which an $H_2$ concentration is maintained at a level of 3 wt % or less), oxidation of the Ni electrode may be suppressed, and thereby an electronic component having a strength of 400 to 740 MPa may be manufactured.

FIG. 1 is a schematic illustration of certain phenomena that occur during sintering under the action of sintering force.

As illustrated in FIG. 1, a ceramic material may undergo grain growth during the sintering process. In the process of grain growth, both densification and coarsening occur in the ceramic material.

Referring to FIG. 1, a driving force of sintering generally consists of changes in the surface energy y and grain boundary energy A of a material.

When an effect where a reduction in the surface energy of the material is dominant, a material may be susceptible to densification, and when an effect where a reduction in the grain boundary energy is dominant, a material may be susceptible to coarsening, and grain growth.

The surface energy of a material may be determined by measuring its Brunauer-Emmett-Teller (BET) value. Since the surface energy of the material increases as its BET value increases, a sintering process may be performed with the aim of reducing the BET value.

In other words, to enhance densification, rather than grain growth, it may be beneficial to use a starting material with a high BET value. Furthermore, the BET value may increase as a particle size of the starting material is decreased when the starting material and the final product have the same chemical composition.

That is, a lower sintering temperature may be used when the BET value of the starting material is high, and such a characteristic may be utilized to manufacture an insulator composition having the same strength as the HTCC composition, even when sintered under middle-temperature conditions, in the range of 1250° C. to 1400° C.

More specifically, in order to lower the sintering temperature, the BET value may be controlled by reducing the size of the starting material to be smaller than that of the starting material used in the HTCC process, and thus the driving force for densification may be increased, as compared to the driving force for grain growth.

In addition, by adjusting the amount of an additive, such as calcium carbonate ($CaCO_3$), magnesium carbonate ($MgCO_3$), or silicon dioxide ($SiO_2$), added at grain boundaries, formed using the MTCC method, a preferred level of strength (e.g. a strength similar to that of the HTCC composition) may be implemented at a temperature lower than that used in a typical sintering process (e.g. a sintering temperature in the HTCC method).

Figure 2:
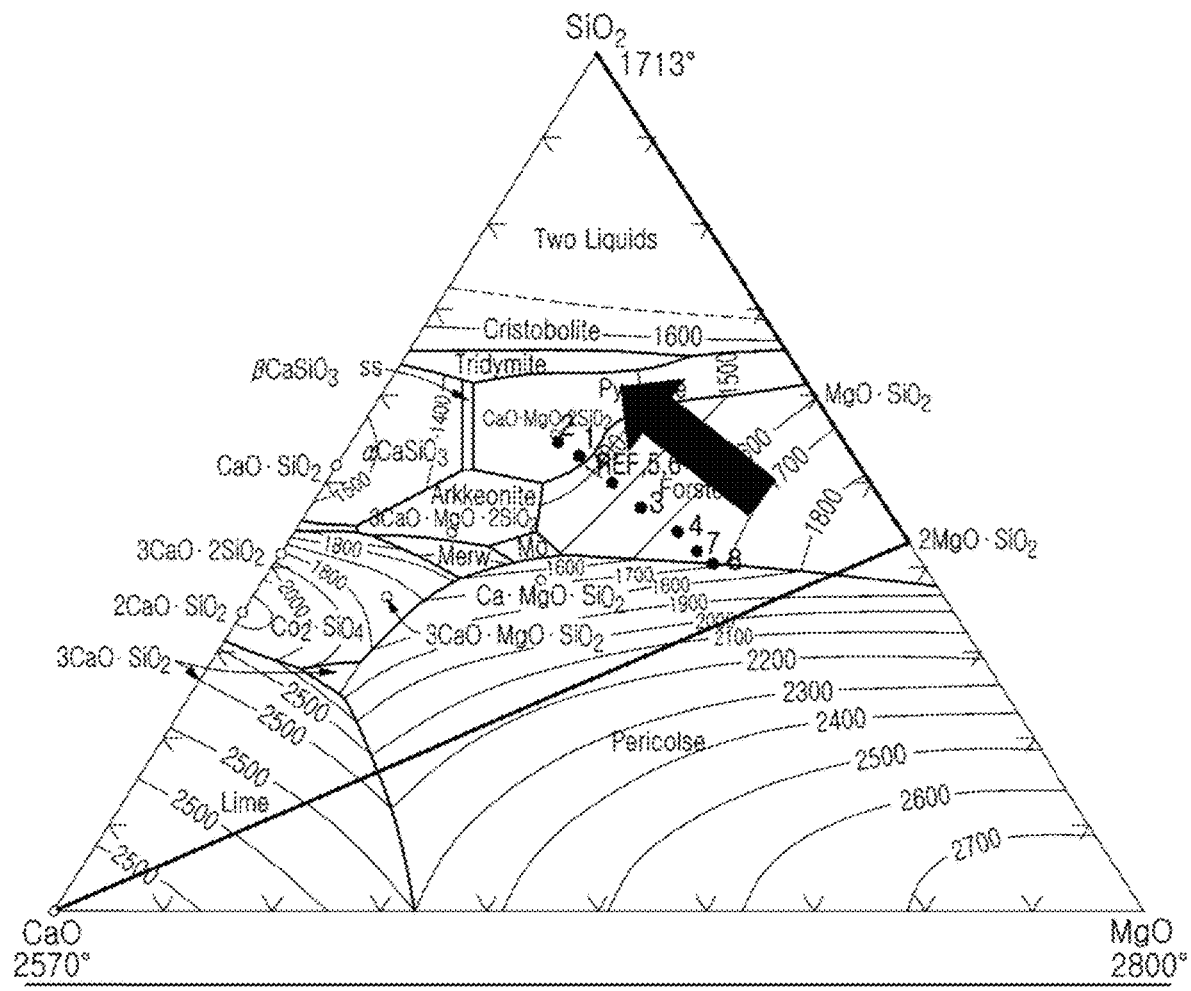
FIG. 2 is a ternary phase diagram of magnesium oxide (MgO)-calcium oxide (CaO)-silicon dioxide ($SiO_2$)

Referring to FIG. 2, ratios of additives in the insulator composition may be adjusted to enable a sintering temperature of 1250° C. to 1400° C. In this regard, 0.92 to 2.01 wt % $CaCO_3$, 0.92 to 2.67 wt % $MgCO_3$, and 1.83 to 4.01 wt % $SiO_2$ may be included as the additives, based on 100 parts by weight of $Al_2O_3$. In particular, since the strength of the insulator composition is less than 400 MPa when the amount of added $SiO_2$ is less than 1.83 wt %, the amount of added $SiO_2$ should be at least 1.83 wt %, based on 100 wt % of $Al_2O_3$, in order to maintain the strength of the insulator composition at 400 MPa or more, regardless of the contents of the other components.

$CaCO_3$, $MgCO_3$ and $SiO_2$ are components that contribute to the generation of the triple point, or a second phase. In order to implement a high strength of 700 MPa or more, the temperature may be below 1400° C., at which temperature calcium (Ca), magnesium (Mg), and silicon (Si) are entirely melted and combined.

In addition, the insulator composition may further include 0.76 to 2.21 wt % of titanium dioxide ($TiO_2$) as an additive, based on 100 wt % of $Al_2O_3$. The $TiO_2$ may be concentrated in the grain boundaries and may function to further improve the strength of the insulator composition, according to the exemplary embodiment in the present disclosure.

Furthermore, the strength of the insulator composition, according to the exemplary embodiment, may be significantly influenced by the ratio of $SiO_2$ to the insulator composition, a primary factor in a liquid-phase sintering process.

The insulator composition, according to the exemplary embodiment, may have a strength of less than 400 MPa when $SiO_2$/Ad1 is less than 44%, and a strength of more than 740 MPa when $SiO_2$/Ad1 exceeds 52%, where $SiO_2$ is the weight of $SiO_2$, and Ad1 is the total weight of $CaCO_3$, $MgCO_3$, and $SiO_2$.

In addition, the insulator composition, according to the exemplary embodiment, may have a strength less than 400 MPa when $TiO_2$/Ad2 is less than 34%, and a strength more than 740 MPa when $TiO_2$/Ad2 exceeds 44%, where $TiO_2$ is the weight of $TiO_2$, and Ad2 is the total weight of $CaCO_3$, $MgCO_3$, $SiO_2$, and $TiO_2$.

Experimental Embodiment

In the experimental embodiment, a strength-measuring bulk K2 was fabricated by controlling a ratio of additives to a base material, that is, $Al_2O_3$, as described above.

When preparing a slurry, zirconia balls were used as mixing/dispersing media, and a main ingredient of both the base material and of the additive powders was mixed with a binder and ethanol/toluene, a dispersant, and then ball-milled for 24 hours.

Molded sheets having a thickness of 5 to 10 μm were manufactured using the prepared slurry and a coater in a small, doctor-blade scheme.

The manufactured molded sheets, having a thickness of 5 to 10 μm, were stacked in an amount of about 40 layers to manufacture a compressed bar, and the compressed bar was cut into sheets (K-square) having a size of 50 cm×15 cm (width by height) by means of a cutter.

The K-square sheets were calcinated at a temperature of 340° C. for 2 hours in an $N_2$ atmosphere, and sintered at a temperature of 1330° C. in an atmosphere of 0.06% $H_2$/99.94% $N_2$ having a wetting temperature of 40° C., that is, in an $H_2$ region in which Ni was not oxidized, so as to be used as an electrode. Then, strength and density characteristics of the K-square sheets were measured.

$Al_2O_3$, the base material of the experimental embodiment, was fixed at 90.5 wt %, $CaCO_3$, $MgCO_3$, $SiO_2$, and additional $TiO_2$ were added thereto. Here, the amounts of additives were changed in various samples, as listed in Table 1 below.

Compared to an HTCC composition sintered at 1600° C. or higher, the samples, according to the experimental embodiment, were sintered at 1330° C., a relatively low temperature, by controlling amounts of additives, as listed in Table 1, below.

TABLE 1

| | $CaCO_3/Al_2O_3$ | $MgCO_3/Al_2O_3$ | $SiO_2/Al_2O_3$ | $TiO_2/Al_2O_3$ | Strength (MPa) |
|---|---|---|---|---|---|
| Ref. | 0.0134 | 0.0134 | 0.0267 | 0.0110 | 660 |
| 1 | 0.0167 | 0.0134 | 0.0335 | 0.0110 | 740 |
| 2 | 0.0201 | 0.0134 | 0.0401 | 0.0110 | 704 |
| 3 | 0.0134 | 0.0167 | 0.0267 | 0.0138 | 589 |
| 4 | 0.0134 | 0.0201 | 0.0267 | 0.0166 | 640 |
| 5 | 0.0113 | 0.0113 | 0.0225 | 0.0093 | 603 |
| 6 | 0.0092 | 0.0092 | 0.0183 | 0.0076 | 400 |
| 7 | 0.0134 | 0.0234 | 0.0267 | 0.0193 | 550 |
| 8 | 0.0134 | 0.0267 | 0.0267 | 0.0221 | 520 |
| Max. | 0.0201 | 0.0267 | 0.0401 | 0.0221 | 740 |
| Min. | 0.0092 | 0.0092 | 0.0183 | 0.0076 | 400 |

An approximate location of the reference composition listed in Table 1 appears in a magnesium oxide (MgO)-calcium oxide (CaO)-silicon dioxide ($SiO_2$) ternary phase diagram of FIG. 2.

In addition, in order to observe variations in strength, a temperature for forming $CaCO_3$, $MgCO_3$, $SiO_2$, and additional $TiO_2$ was changed to be higher than approximately 1300° C., that is, the sintering temperature, according to the exemplary embodiment in the present disclosure.

The ranges of compositions illustrated in FIG. 2 may be expressed as listed in Table 1. It can be seen that when the wt % ratios of additives to the base material, $Al_2O_3$, vary in the range of $0.0092 \leq CaCO_3/Al_2O_3 \leq 0.0201$, $0.0092 \leq MgCO_3/Al_2O_3 \leq 0.0267$, $0.0183 \leq SiO_2/Al_2O_3 \leq 0.0401$, and $0.0076 \leq TiO_2/Al_2O_3 \leq 0.0221$, each composition may implement a strength of 400 to 740 MPa. It may be appreciated that the driving force for sintering of the composition increases, thereby allowing low-temperature sintering within the above-described composition ranges.

In addition, it can be seen that the strength of the composition is improved when the amount of Si with respect to the total amount of Ca, Mg, and Si, or the total amount of Ca, Mg, Si, and Ti, increases. However, as described above, since the strength of the composition is less than 400 MPa when the content of $SiO_2$ is less than 1.83 wt %, the content of $SiO_2$ may be properly set to be 1.83 wt % or more.

It may also be seen that the strength of the composition is less than 400 MPa when the content of $CaCO_3$ is less than 0.92 wt %. Therefore, the content of $CaCO_3$ may be properly set to be 0.92 wt % or more.

It may also be seen that the strength of the composition is less than 400 MPa when the content of $MgCO_3$ is less than 0.92 wt %. Therefore, the content of $MgCO_3$ may be properly set to be 0.92 wt % or more.

Meanwhile, referring to FIG. 2 and Table 1, a strength of 700 MPa or more was implemented in Sample 1 and Sample 2, having wt % ratios in the range of $0.0167 \leq CaCO_3/Al_2O_3 \leq 0.0201$, $0.0335 \leq SiO_2/Al_2O_3 \leq 0.0401$, $MgCO_3/Al_2O_3 = 0.0134$, and $TiO_2/Al_2O_3 = 0.0110$. In particular, a strength of 740 MPa or more was achieved in the composition of Sample 1.

Figure 3:
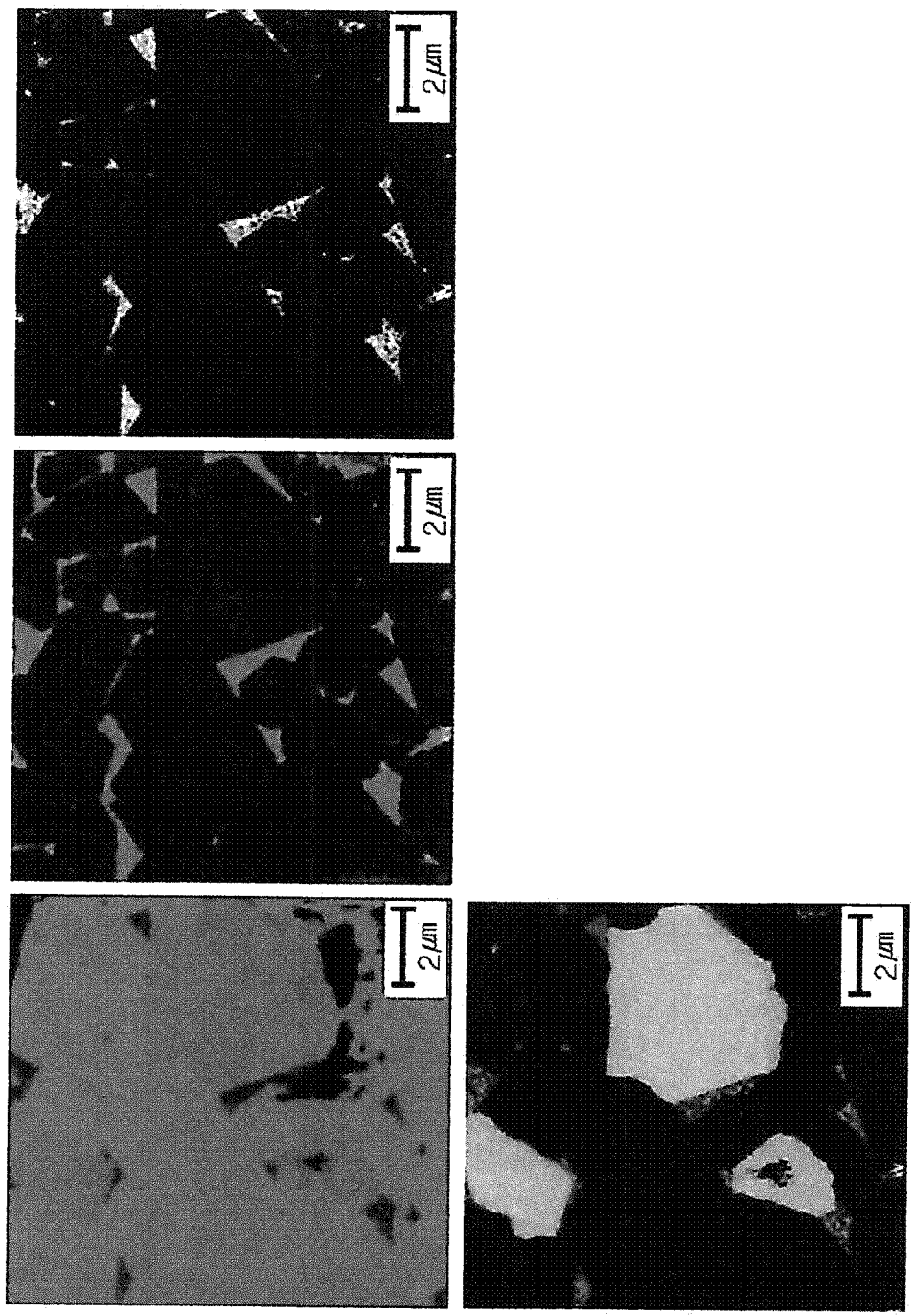
FIG. 3 is a photograph illustrating a result of an energy dispersive spectroscopy (EDS) analysis of a normal high temperature co-fired ceramic (HTCC) composition.
Figure 4:
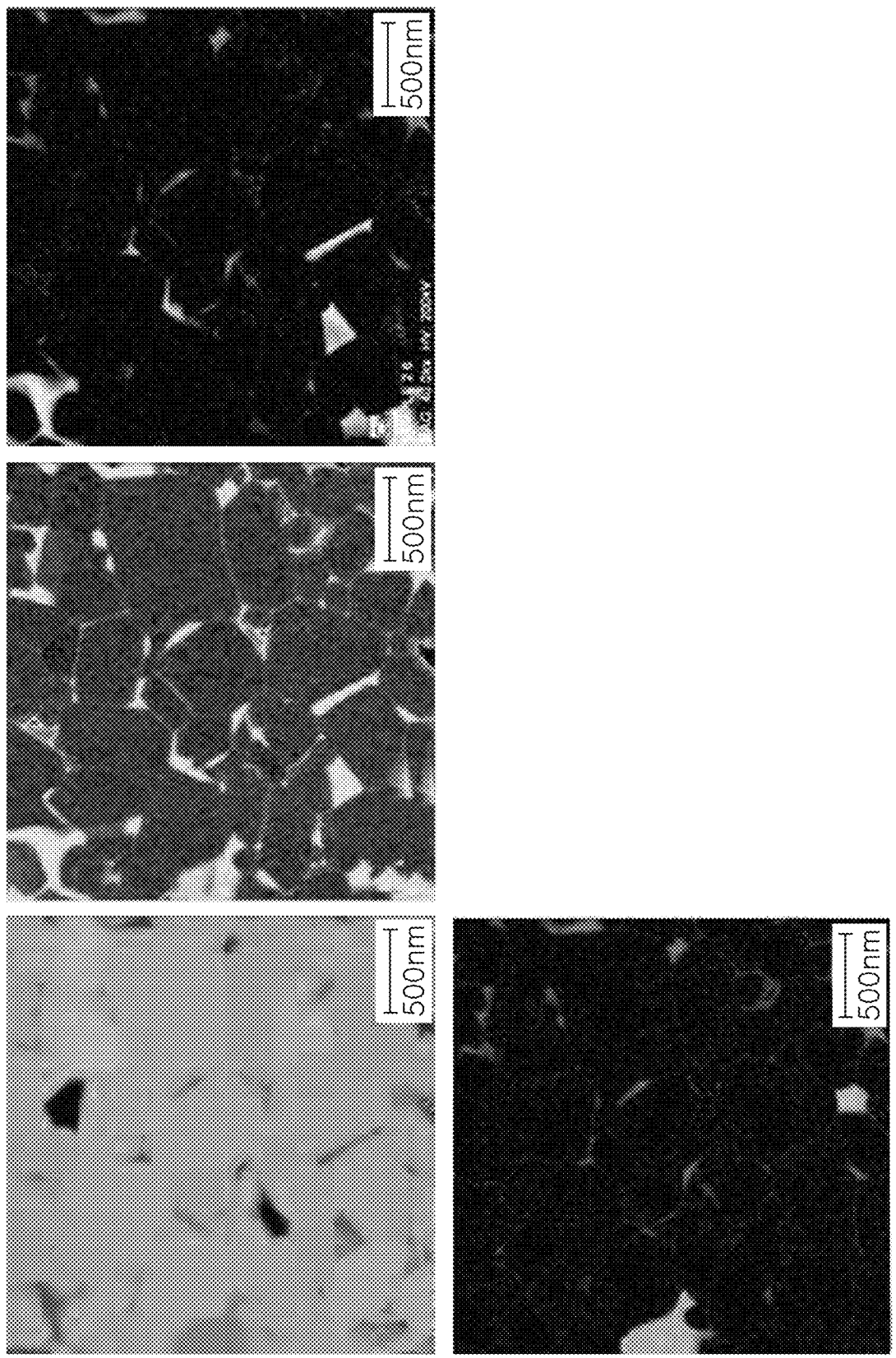
FIG. 4 is a photograph illustrating a result of an EDS analysis of a medium temperature co-fired ceramic (MTCC) composition, according to an exemplary embodiment in the present disclosure.

FIG. 3 is a photograph illustrating a result of energy dispersive spectroscopy (EDS) analysis of a normal HTCC composition, and FIG. 4 is a photograph illustrating a result of EDS analysis of a medium temperature co-fired ceramic (MTCC) composition, according to an exemplary embodiment in the present disclosure.

Referring to FIG. 3, the HTCC composition, as a comparative example, may be sintered simultaneously with W or Mo to form an internal electrode at a temperature of 1600° C. or higher, while oxidation of the internal electrode is inhibited in a hydrogen-rich atmosphere.

Referring to FIG. 4, the MTCC composition, according to the exemplary embodiment in the present disclosure, shows a different behavior from that of the HTCC composition.

That is, in the comparative example, Ca, Si, and Mg are substantially entirely melted and mixed with each other to form Al—Mg—O having a significantly large particle size. However, in the exemplary embodiment, although Ca, Si, and Mg are melted and mixed with each other, a region in which Ca and Si are entirely melted, while Mg remains unmelted, may be present.

When compared with the comparative example, the exemplary embodiment exhibits a feature in which less Mg is melted than Ca and Si. Accordingly, while the Ca, Si, and Mg in the comparative example are actively melted to form an Al—Mg—O second phase having a large particle size, the Ca, S and Mg in the exemplary embodiment may not be entirely melted, thereby forming Si—Ca—O and Si—Mg—O second phases.

Figure 5:
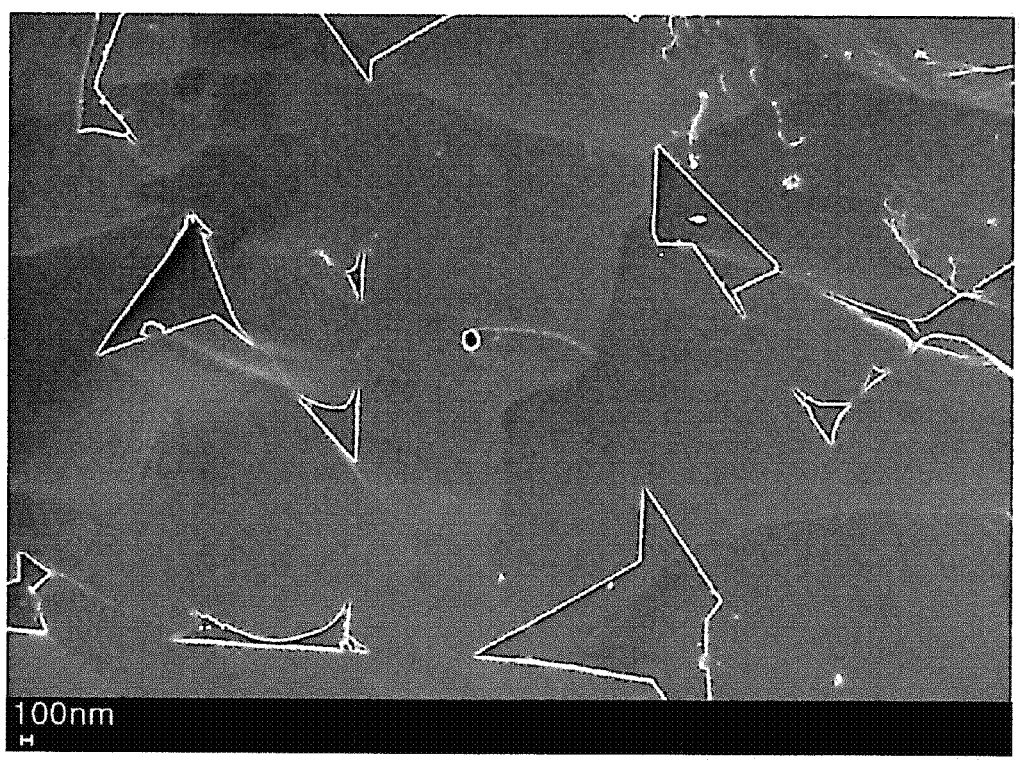
FIG. 5 is a scanning electron microscope (SEM) photograph illustrating a microstructure of a normal HTCC composition.
Figure 6:
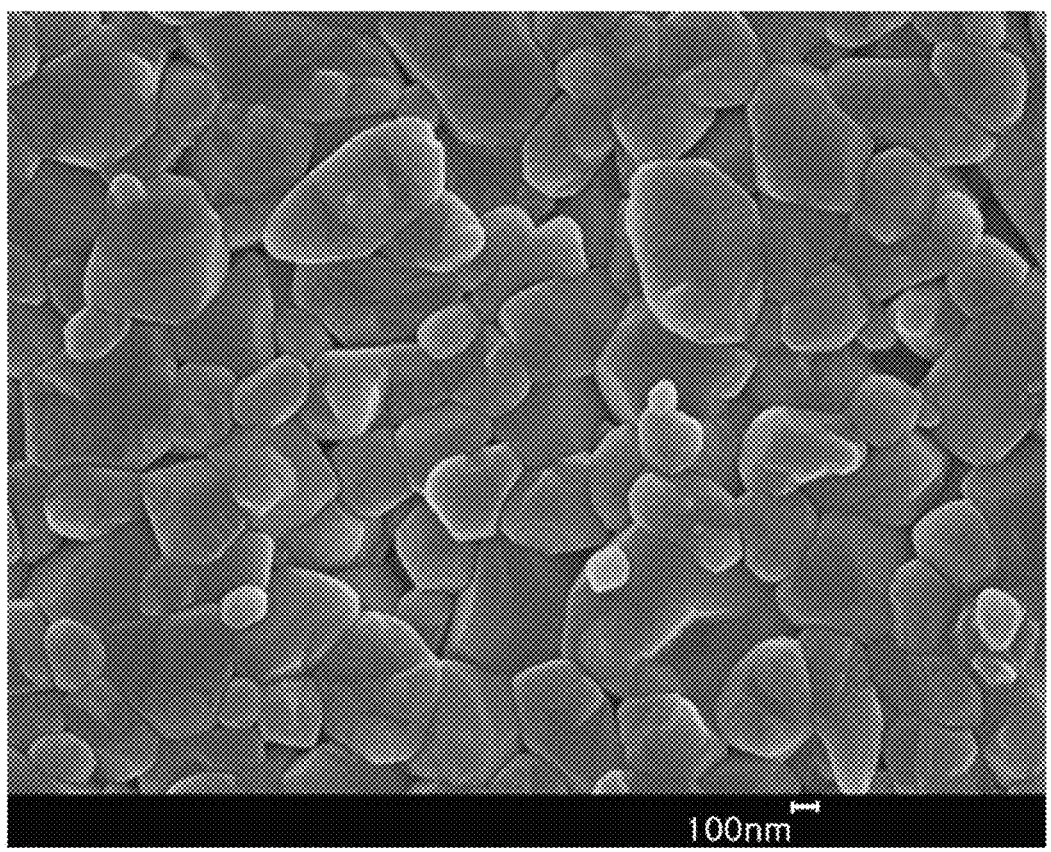
FIG. 6 is an SEM photograph illustrating a microstructure of an MTCC composition, according to an exemplary embodiment in the present disclosure.

FIG. 5 is a scanning electron microscope (SEM) photograph illustrating a microstructure of a normal HTCC composition, and FIG. 6 is an SEM photograph illustrating a microstructure of an MTCC composition, according to an exemplary embodiment in the present disclosure.

Referring to FIG. 5, the HTCC composition in the comparative example has an average grain size of 1.5 μm or more after sintering, and a microstructure in which Ca, Mg, and Si are melted.

Referring to FIG. 6, the MTCC insulator composition, according to the exemplary embodiment, has an average grain size of about 350 nm, a significantly reduced grain size compared to that of the comparative HTCC insulator composition. The distribution of the grain size of the MTCC insulator composition may be in the range of 120 to 500 nm.

In addition, it can be seen that the MTCC composition has very low Mg solid solubility, and the additives are very uniformly distributed therein.

Therefore, according to the present exemplary embodiment, a ceramic package having the same level of strength as the HTCC ceramic package, while being sintered in the medium temperature range (e.g. 1250° C. to 1400° C.), may be provided. More specifically, a method of manufacturing the MTCC composition resulting in a strength of 400 MPa or more while being sintered at a temperature in the range of 1250° C. to 1400° C. may be provided.

The MTCC insulator composition, according to the exemplary embodiment in the present disclosure, may implement the same level of strength as a typical HTCC insulator composition while having a relatively low sintering temperature (that is, a sintering temperature lower than that of a typical HTCC insulator composition).

In addition, since the MTCC insulator composition is sintered in a slightly reducing atmosphere at a temperature allowing a Ni electrode to be used, the sintering atmosphere may be easily controlled. In other words, oxidation of Ni may be suppressed by adjusting the reducing atmosphere (in which an $H_2$ concentration is maintained to be 3 wt % or less).

The insulator composition, according to the exemplary embodiment in the present disclosure, may be used to manufacture an electronic component, such as a ceramic package (e.g. a package for a crystal (X-tal), an internal stacking module (ISM), or a surface acoustic wave (SAW) module), or an electrostatic chuck (ESC).

In order to manufacture a ceramic package, strength and flatness thereof need to be secured. The MTCC insulator composition, according to the exemplary embodiment, may be sintered at a temperature of 1250° C. to 1400° C., different from a sintering temperature of a normal LTCC or HTCC insulator composition, by properly adjusting the ratio of additives, as described above.

Accordingly, since the MTCC insulator composition, according to the exemplary embodiment, is sintered in a slightly reducing atmosphere by using a Ni electrode, instead of a W electrode or a Mo electrode having very strong oxidizing properties, the sintering atmosphere may be easily controlled and a ceramic package having the same level of strength as an HTCC-produced ceramic package may be provided.

In addition, since the ceramic package manufactured using the MTCC composition may include a Ni electrode, which may be produced at low cost while having excellent electrical connectivity, manufacturing costs thereof may be decreased and variations in electrical properties thereof may be improved.

Furthermore, although resistivity and strength are important factors in the ESC, the MTCC composition, according to the exemplary embodiment, rather than the HTCC or LTCC insulator composition, may be applied to the ESC in order to use a Ni electrode.

As set forth above, according to exemplary embodiments in the present disclosure, an insulator composition including $Al_2O_3$ having a particle size within the range of 120 to 500 nm of a base material may be manufactured. Furthermore, the insulator composition may implement a strength of 400 to 740 MPa, while the sintering temperature of the insulator composition may be lowered to 1250° C. to 1400° C.

In addition, according to the exemplary embodiments in the present disclosure, when manufacturing an electronic product, such as a ceramic package, using an insulator composition, a sintering atmosphere may be easily controlled, and a Ni electrode, rather than a W or Mo electrode, may be used as an internal electrode.

While exemplary embodiments have been shown and described above, it will be apparent to those skilled in the art that modifications and variations could be made without departing from the scope of the invention as defined by the appended claims.

What is claimed is:

1. An insulator composition comprising $Al_2O_3$ having a particle size within a range of 120 to 500 nm; and
0.92 to 2.01 wt % $CaCO_3$, 0.92 to 2.67 wt % $MgCO_3$, and 1.83 to 4.01 wt % $SiO_2$, based on 100 wt % of $Al_2O_3$.

2. The insulator composition of claim 1, wherein a weight ratio of $SiO_2$ to a total weight of $CaCO_3$, $MgCO_3$, and $SiO_2$ is within a range of 0.44 to 0.52.

3. The insulator composition of claim 1, further comprising 0.76 to 2.21 wt % $TiO_2$, based on 100 wt % of $Al_2O_3$.

4. The insulator composition of claim 3, wherein a weight ratio of $TiO_2$ to a total weight of $CaCO_3$, $MgCO_3$, $SiO_2$, and $TiO_2$ is within a range of 0.34 to 0.44.

5. The insulator composition of claim 1, wherein the particle size of $Al_2O_3$ is within a range of 250 to 500 nm.

6. The insulator composition of claim 3, wherein a content of $CaCO_3$ is 1.67 to 2.01 wt %, a content of $MgCO_3$ is 1.00 to 2.67 wt %, a content of $SiO_2$ is 3.35 to 4.01 wt %, and a content of $TiO_2$ is 1.00 to 2.21 wt %, based on 100 wt % of $Al_2O_3$.

7. A method of manufacturing an electronic component, comprising steps of:
    simultaneously sintering an insulator composition and an electrode including nickel (Ni) as a main component at a temperature of 1250° C. to 1400° C., the insulator composition including $Al_2O_3$ having a particle size within a range of 120 to 500 nm, 0.92 to 2.01 wt % $CaCO_3$, 0.92 to 2.67 wt % $MgCO_3$, and 1.83 to 4.01 wt % $SiO_2$, based on 100 wt % of $Al_2O_3$; and
    adjusting a reducing atmosphere (in which an $H_2$ concentration is maintained to be 3 wt % or less) to suppress oxidation of Ni.

8. The method of claim 7, wherein a weight ratio of $SiO_2$ to a total weight of $CaCO_3$, $MgCO_3$, and $SiO_2$ is within a range of 0.44 to 0.52.

9. The method of claim 7, wherein the insulator composition further comprises 0.76 to 2.21 wt % $TiO_2$, based on 100 wt % of $Al_2O_3$.

10. The method of claim 9, wherein a weight ratio of $TiO_2$ to a total weight of $CaCO_3$, $MgCO_3$, $SiO_2$, and $TiO_2$ is within a range of 0.34 to 0.44.

11. A sintered insulator composition comprising $Al_2O_3$, $CaCO_3$, $MgCO_3$ and $SiO_2$, wherein a grain size of the sintered insulator composition is less than 1 μm, and wherein a content of $CaCO_3$ is 0.92 to 2.01 wt %, a content of $MgCO_3$ is 0.92 to 2.67 wt %, a content of $SiO_2$ is 1.83 to 4.01 wt %, based on 100 wt % of $Al_2O_3$.

12. The sintered insulator composition of claim 11, further comprising 0.76 to 2.21 wt % $TiO_2$, based on 100 wt % of $Al_2O_3$.

13. The sintered insulator composition of claim 11, wherein a weight ratio of $SiO_2$ to a total weight of $CaCO_3$, $MgCO_3$, and $SiO_2$ is within a range of 0.44 to 0.52.

14. The sintered insulator composition of claim 12, wherein a weight ratio of $TiO_2$ to a total weight of $CaCO_3$, $MgCO_3$, $SiO_2$, and $TiO_2$ is within a range of 0.34 to 0.44.

15. The sintered insulator composition of claim 11, wherein an average grain size of the sintered insulator composition is less than 400 nm.

16. A method of manufacturing an insulator composition, comprising a step of:
    forming the insulator composition by sintering a base material at a temperature of 1250° C. to 1400° C., wherein the base material includes $Al_2O_3$ having a particle size within a range of 120 to 500 nm, 0.92 to 2.01 wt % $CaCO_3$, 0.92 to 2.67 wt % $MgCO_3$, and 1.83 to 4.01 wt % $SiO_2$, based on 100 wt % of $Al_2O_3$.

17. The method of claim 16, further comprising a step of adjusting a reducing atmosphere in which an $H_2$ concentration is maintained to be 3 wt % or lees.

18. The method of claim 16, wherein an average grain size of the insulator composition is less than 400 nm.

19. The method of claim 16, wherein the base material further comprises 0.76 to 2.21 wt % $TiO_2$, based on 100 wt % of $Al_2O_3$.

20. The method of claim 16, wherein, a weight ratio of $SiO_2$ to a total weight of $CaCO_3$, $MgCO_3$, and $SiO_2$ is within a range of 0.44 to 0.52.

21. The method of claim 19, wherein a weight ratio of $TiO_2$ to a total weight of $CaCO_3$, $MgCO_3$, $SiO_2$, and $TiO_2$ is within a range of 0.34 to 0.44.

* * * * *